(12) United States Patent
Sun et al.

(10) Patent No.: US 11,025,315 B2
(45) Date of Patent: Jun. 1, 2021

(54) METHOD OF INDICATING SPATIAL CHARACTERISTIC PARAMETER SET, USER-SIDE DEVICE AND NETWORK-SIDE DEVICE

(71) Applicant: VIVO MOBILE COMMUNICATION CO., LTD., Chang'an Dongguan (CN)

(72) Inventors: Peng Sun, Chang'an Dongguan (CN); Xueming Pan, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 0 days.

(21) Appl. No.: 16/637,824

(22) PCT Filed: Aug. 9, 2018

(86) PCT No.: PCT/CN2018/099576
§ 371 (c)(1),
(2) Date: Feb. 10, 2020

(87) PCT Pub. No.: WO2019/029610
PCT Pub. Date: Feb. 14, 2019

(65) Prior Publication Data
US 2020/0373976 A1    Nov. 26, 2020

(30) Foreign Application Priority Data
Aug. 10, 2017   (CN) .......................... 201710681979.7

(51) Int. Cl.
*H04B 7/0456* (2017.01)
*H04W 72/12* (2009.01)

(52) U.S. Cl.
CPC ...... *H04B 7/0456* (2013.01); *H04W 72/1289* (2013.01)

(58) Field of Classification Search
CPC .................................................... H04B 7/0456
(Continued)

(56) References Cited

U.S. PATENT DOCUMENTS 10,326,512 B2 * 6/2019 Li .......................... H04B 7/0469
2010/0279621 A1   11/2010 Brown et al.
(Continued)

FOREIGN PATENT DOCUMENTS

CN   101789848 A   7/2010
CN   102422556 A   4/2012
(Continued)

OTHER PUBLICATIONS

"3 Generation Partnership Project; Technical Specification Group Radio Access Network; Study on New Radio Access Technology Physical Layer Aspects (Release 14)", 3GPP TR 38.802, V14.1.0, Jun. 2017, France (144 pages).
(Continued)

*Primary Examiner* — Lihong Yu
(74) *Attorney, Agent, or Firm* — Culhane Meadows PLLC; Stephen J. Weed

(57) ABSTRACT

A method of indicating a spatial characteristic parameter set, a user-side device and a network-side device are provided. The method includes: acquiring first indication information, wherein the first indication information indirectly indicates a spatial characteristic parameter set scheduled to the user-side device, the spatial characteristic parameter set is one of a plurality of spatial characteristic parameter sets configured for the user-side device; determining, according to the first indication information, the spatial characteristic parameter set scheduled to the user-side device.

20 Claims, 4 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2013/0121342 A1 | 5/2013 | Kim | |
| 2013/0163544 A1 | 6/2013 | Lee et al. | |
| 2014/0254701 A1 | 9/2014 | Geirhofer et al. | |
| 2019/0021096 A1* | 1/2019 | Nilsson | H04B 7/0617 |
| 2019/0306847 A1* | 10/2019 | Seo | H04L 25/022 |

FOREIGN PATENT DOCUMENTS

| | | |
|---|---|---|
| CN | 102938687 A | 2/2013 |
| CN | 104702324 A | 6/2015 |
| CN | 104734760 A | 6/2015 |
| WO | 2017082810 A1 | 5/2017 |

OTHER PUBLICATIONS

1st Chinese Office Action for Chinese Application No. 201710681979.7, dated Aug. 5, 2019 (Aug. 5, 2019)—12 pages (English translation—9 pages).

Extended European Search Report for European Application No. 18845220.5, dated Apr. 24, 2020 (Apr. 24, 2020)—10 pages.

International Search Report and Written Opinion for International Application No. PCT/CN2018/099576, dated Feb. 20, 2020 (Feb. 20, 2020)—9 pages (English translation—5 pages).

Samsung: "Discussion on Rx beam set based reporting," R1-1709036, 3GPP TSG RAN WG1#89, Hangzhou, China, May 15, 2017, 5 pages.

Samsung: "WF on beam indication for PDCCH," R1-1709381, 3GPP TSG RAN WG1 Meeting #89, Hangzhou, China, May 15, 2017, 3 pages.

* cited by examiner

METHOD OF INDICATING SPATIAL CHARACTERISTIC PARAMETER SET, USER-SIDE DEVICE AND NETWORK-SIDE DEVICE

CROSS-REFERENCE TO RELATED APPLICATION

This application is a U.S. national phase application of a PCT Application No. PCT/CN2018/099576 filed on Aug. 9, 2018, which claims priority to a Chinese Patent Application No. 201710681979.7, filed in China on Aug. 10, 2017, the disclosure of which is incorporated herein by reference in its entirety.

TECHNICAL FIELD

The present disclosure relates to the field of communication, and in particular, relates to a method of indicating a spatial characteristic parameter set, a user-side device, and a network-side device.

BACKGROUND

In the field of communication, a communication method based on large-scale antennas may increase a peak rate and spectrum utilization of a communication system, and a high frequency band has rich spatial frequency resources. Therefore, a large-scale antenna communication technology and a high-frequency communication technology will be introduced in a 5th generation (5G) mobile network.

In the 5G, a network-side device needs to indicate to a user equipment (UE) a variety of spatial characteristic parameters (such as beams, precoding matrices), which will result in large signaling overhead if the indication method in the related art is used.

SUMMARY

Some embodiments of the present disclosure provide a method of indicating a spatial characteristic parameter set, a user-side device and a network-side device.

In a first aspect, the present disclosure provides a method of indicating a spatial characteristic parameter set, and the method is performed by a user-side device and includes: acquiring first indication information, wherein the first indication information indirectly indicates a spatial characteristic parameter set scheduled to the user-side device, the spatial characteristic parameter set is one of a plurality of spatial characteristic parameter sets configured for the user-side device; determining, according to the first indication information, the spatial characteristic parameter set scheduled to the user-side device.

In a second aspect, the present disclosure provides a method of indicating a spatial characteristic parameter set, and the method is performed by a network-side device and includes: determining first indication information, wherein the first indication information indirectly indicates a spatial characteristic parameter set scheduled to the user-side device, and the spatial characteristic parameter set is one of a plurality of spatial characteristic parameter sets configured for the user-side device; transmitting the first indication information.

In a third aspect, the present disclosure provides a user-side device. The user-side device includes: a first processing module, used to acquire first indication information, wherein the first indication information indirectly indicates a spatial characteristic parameter set scheduled to the user-side device, and the spatial characteristic parameter set is one of a plurality of spatial characteristic parameter sets configured for the user-side device; a second processing module, used to determine, according to the first indication information, the spatial characteristic parameter set scheduled to the user-side device.

In a fourth aspect, the present disclosure provides a network-side device. The network-side device includes: a processing module, used to determine first indication information, wherein the first indication information indirectly indicates a spatial characteristic parameter set scheduled to the user-side device, and the spatial characteristic parameter set is one of a plurality of spatial characteristic parameter sets configured for the user-side device; a transceiving module, used to transmit the first indication information.

In a fifth aspect, the present disclosure provides a user-side device. The user-side device includes a storage, a processor, and a program of indicating a spatial characteristic parameter set, wherein the program of indicating a spatial characteristic parameter set is stored on the storage and executable by the processor, and in a case that the program is executed by the processor, the processor implements steps of the method of indicating a spatial characteristic parameter set according to the first aspect.

In a sixth aspect, the present disclosure provides a network-side device. The network-side device includes a storage, a processor, and a program of indicating a spatial characteristic parameter set, wherein the program of indicating a spatial characteristic parameter set is stored on the storage and executable by the processor, and in a case that the program is executed by the processor, the processor implements steps of the method of indicating a spatial characteristic parameter set according to the second aspect.

In a seventh aspect, the present disclosure provides a computer readable storage medium, wherein a program of indicating a spatial characteristic parameter set is stored on the computer readable storage medium; in a case that the program of indicating a spatial characteristic parameter set is executed by a processor, the processor implements steps of the method of indicating a spatial characteristic parameter set according to the first aspect.

In an eighth aspect, the present disclosure provides a computer readable storage medium, wherein a program of indicating a spatial characteristic parameter set is stored on the computer readable storage medium; in a case that the program of indicating a spatial characteristic parameter set is executed by a processor, the processor implements steps of the method of indicating a spatial characteristic parameter set according to the second aspect.

BRIEF DESCRIPTION OF THE DRAWINGS

In order to more clearly illustrate technical solutions in some embodiments of the present disclosure or in the related art, drawings used in description of some embodiments or the related art will be briefly introduced below. Obviously, the drawings in the following description are only some embodiments described in the present disclosure. Based on these drawings, other drawings may be obtained by a person of ordinary skills in the art without any creative effort.

DETAILED DESCRIPTION

Figure 1:
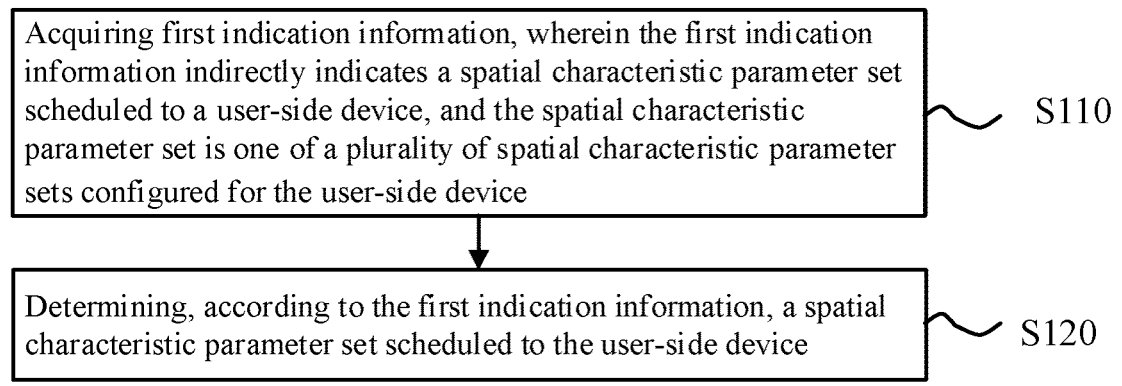
FIG. 1 is a first schematic flowchart illustrating a method of indicating a spatial characteristic parameter set according to some embodiments of the present disclosure.

In order for a person skilled in the art to better understand the technical solutions in the present disclosure, technical solutions in some embodiments of the present disclosure will be clearly and completely described below with reference to the drawings of the present disclosure. Apparently, the described embodiments are only some, rather than all, of embodiments of the present disclosure. Based on the embodiments of the present disclosure, all other embodiments derived by a person of ordinary skills in the art without any creative effort shall fall within the protection scope of the present disclosure.

The method of indicating a spatial characteristic parameter set, the user-side device and the network-side device provided by some embodiments of the present disclosure may solve a problem that an indication of a spatial characteristic parameter causes large signaling overhead.

It should be understood that the technical solutions of some embodiments of the present disclosure may be applied to various communication systems, such as, a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS) system or a Worldwide Interoperability for Microwave Access (WiMAX) communication system, a 5G system, or a New Radio (NR) system.

In some embodiments of the present disclosure, the user-side device may include, but is not limited to, a Mobile Station (MS), a Mobile Terminal, a Mobile Telephone, a User Equipment (UE), a handset, a portable equipment and a vehicle, etc. The user-side device may communicate with one or more core networks via a Radio Access Network (RAN), and for example, the user-side device may be a mobile phone (or referred to as "cellular" phone), a computer having a function of a wireless communication, and the like; the user-side device may also be a portable mobile device, a pocket-sized mobile device, a handheld mobile device, a computer built-in mobile device or an in-vehicle mobile device.

In some embodiments of the present disclosure, the network-side device is a device deployed in a radio access network to provide a wireless communication function for the user-side device. The network-side device may be a base station, and the base station may include various forms of macro base stations, micro base stations, relay stations, access points, and so on. In systems using different wireless access technologies, names of devices having a function of a base station may be different. For example, an Evolved NodeB (eNB or eNodeB) in an LTE network may be a Node B in a 3rd generation (3G) network, and the like.

It should be noted that, methods of some embodiments of the present disclosure may be applied to an indication of a downlink spatial characteristic parameter set, and may also be applied to an indication of an uplink spatial characteristic parameter set. Optionally, it may be understood that first indication information in some embodiments of the present disclosure may indicate a downlink spatial characteristic parameter set scheduled to a user-side device by way of indirect indication, and the first indication information may also indicate an uplink spatial characteristic parameter set scheduled to the user-side device by way of indirect indication.

FIG. 1 is a schematic flowchart illustrating a method of indicating a spatial characteristic parameter set according to some embodiments of the present disclosure, and the method shown in FIG. 1 may be executed by a user-side device. As shown in FIG. 1, a method 100 includes steps S110 to S120.

S110: acquiring first indication information, wherein the first indication information indirectly indicates a spatial characteristic parameter set scheduled to a user-side device, and the spatial characteristic parameter set is one of a plurality of spatial characteristic parameter sets configured for the user-side device.

Optionally, in S110, the plurality of spatial characteristic parameter sets configured for the user-side device are a plurality of spatial characteristic parameter sets configured for the user-side device as specified in a protocol, or the network-side device configures the plurality of spatial characteristic parameter sets configured for the user-side device through configuration information. For example, the network-side device configures the plurality of spatial characteristic parameter sets for the user-side device through a Radio Resource Control (RRC) transmitted to the user-side device. Optionally, the network-side device configures the plurality of spatial characteristic parameter sets for the user-side device through a Media Access Control Control Element (MAC CE) transmitted to the user-side device. Optionally, the network-side device configures a plurality of spatial characteristic parameter sets for the user-side device through Downlink Control Information (DCI).

Optionally, in S110, the spatial characteristic parameter set includes a beam set and/or a precoding matrix set. That is, the first indication information indirectly indicates a beam set and/or a precoding matrix set scheduled to the user-side device.

Optionally, as an example, each spatial characteristic parameter set includes at least one set element, and the set element is a spatial characteristic parameter group, and the spatial characteristic parameter group includes at least one spatial characteristic parameter. That is, each spatial characteristic parameter set may include one or more spatial characteristic parameters, or each spatial characteristic parameter set may include one or more spatial characteristic parameter groups, or each spatial characteristic parameter set may include one or more spatial characteristic parameters and one or more spatial characteristic parameter groups.

Optionally, as an example, there is an identical set element in different spatial characteristic parameter sets. For example, it is assumed that there are two spatial characteristic parameter sets, namely a spatial characteristic parameter set 1 and a spatial characteristic parameter set 2. The spatial characteristic parameter set 1 includes a spatial characteristic parameter 1, a spatial characteristic parameter 2 and a spatial characteristic parameter group [a spatial characteristic parameter 3, a spatial characteristic parameter 4]. The spatial characteristic parameter set 2 includes a spatial characteristic parameter 1, a spatial characteristic parameter 5 and a spatial characteristic parameter group [a spatial characteristic parameter 6, a spatial characteristic parameter 7].

Optionally, as another example, the set elements in different spatial characteristic parameter sets are completely different. For example, it is assumed that there are two spatial characteristic parameter sets, namely a spatial characteristic parameter set 1 and a spatial characteristic parameter set 2. The spatial characteristic parameter set 1 includes a spatial characteristic parameter 1, a spatial characteristic parameter 2 and a spatial characteristic parameter group [a spatial characteristic parameter 3, a spatial characteristic parameter 4]. The spatial characteristic parameter set 2 includes a spatial characteristic parameter 5, a spatial characteristic parameter 6 and a spatial characteristic parameter group [a spatial characteristic parameter 7, a spatial characteristic parameter 8].

S120: determining, according to the first indication information, a spatial characteristic parameter set scheduled to the user-side device.

Specifically, the method of indicating a spatial characteristic parameter set in some embodiments of the present disclosure mainly includes a method described in the following examples:

First Example: the first indication information is beam indication information, the beam indication information directly indicates a beam group scheduled to the user-side device in a beam set; or the first indication information is precoding matrix indication information, and the precoding matrix indication information directly indicates a precoding matrix group scheduled to the user-side device in a precoding matrix set.

In S110, the first indication information is beam indication information, the beam indication information directly indicates a beam group scheduled to the user-side device in the beam set. Correspondingly, in S120, the user-side device may determine, according to mapping relationship between the beam indication information and the beam set, the beam set scheduled to the user-side device. Optionally, in S110, the first indication information is precoding matrix indication information, and the precoding matrix indication information directly indicates a precoding matrix group scheduled to the user-side device. Correspondingly, the user-side device may determine, according to mapping relationship between the precoding matrix indication information and the precoding matrix set, the precoding matrix set scheduled to the user-side device.

Figure 2:
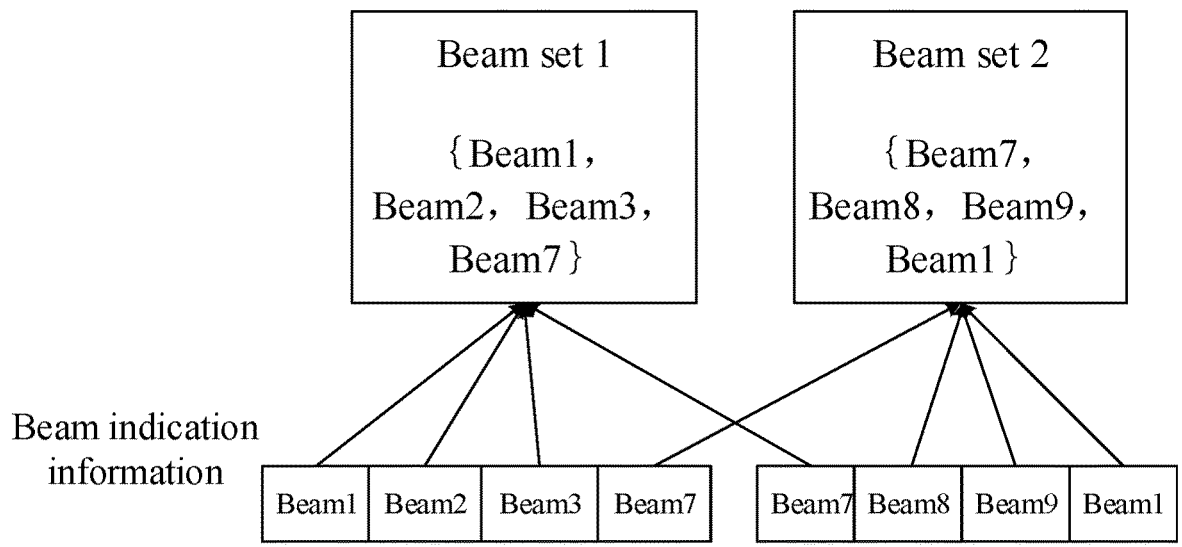
FIG. 2 is a first schematic diagram illustrating a method of indicating a spatial characteristic parameter set according to some embodiments of the present disclosure.

Taking a case as an example in which the spatial characteristic parameter set includes a beam set and the first indication information is beam indication information. As shown in FIG. 2, Beam set 1 includes Beam 1, Beam 2, Beam 3, and Beam 7; and Beam set 2 includes Beam 7, Beam 8, Beam 9, and Beam 1. If the first indication information indicates Beam 1, Beam 2, and Beam 3, the user-side device determines that the beam set scheduled to the user-side device is Beam set 1. If the first indication information indicates Beam 7, Beam 8, and Beam 9, the user-side device determines that the beam set scheduled to the user-side device is Beam set 2.

Optionally, as an example, the beam indication information indicates a beam by using 2 bits. If a currently effective beam set is Beam set 1, a correspondence relation between beam indication information and a beam may be: "00" used for indicating Beam 1, "01" used for indicating Beam 2, "10" used for indicating Beam 3, and "11" used for indicating Beam 7. If the currently effective beam set is Beam set 2, the correspondence relation between beam indication information and a beam may be: "00" used for indicating Beam 7, "01" used for indicating Beam 8, "10" used for indicating Beam 9, and "11" used for indicating Beam 1.

Further, a beam set may be associated with another beam set through a specific beam group therein. In this case, the user-side device determines, in a case that the beam group indicated by the beam indication information is a non-specific beam group in a first beam set, that the beam set scheduled to the user-side device is the first beam set. The user-side device determines, in a case that the beam group indicated by the beam indication information is a specific beam group in a second beam set, that the beam set scheduled to the user-side device is a beam set associated with the second beam set through the beam group indicated by the beam indication information. A precoding matrix set may be associated with another precoding matrix set through a specific precoding matrix group therein. In this case, the user-side device determines, in a case that the precoding matrix group indicated by the precoding matrix indication information is a non-specific precoding matrix group in a first precoding matrix set, that the precoding matrix set scheduled to the user-side device is the first precoding matrix set. The user-side device determines, in a case that the precoding matrix group indicated by the precoding matrix indication information is a specific precoding matrix group in a second precoding matrix set, that the precoding matrix set scheduled to the user-side device is a precoding matrix set associated with the second precoding matrix set through the precoding matrix group indicated by the precoding matrix indication information.

Similarly, taking the beam sets shown in FIG. 2 as an example, Beam set 1 is associated with Beam set 2 through Beam 1 and Beam 7. In a case that the currently effective beam set is Beam set 1 and the beam indication information is "00", the beam indicated by the beam indication information is Beam 1 in this scheduling and the beam indication information implicitly indicates that the beam set scheduled to the user-side device continues to be Beam set 1. In a case that the currently effective beam set is Beam set 1, and the beam indication information is "11", the beam indicated by the beam indication information is Beam 7 in this scheduling, and the beam indication information implicitly indicates that the beam set scheduled to the user-side device is switched to Beam set 2 from a time instance when a specified condition is satisfied. The Beam set 2 that takes effect at the time instance when the specified condition is satisfied, remains in effect until the beam indication information received by the user-side device is "11". That is, before the beam indicated by the beam indication information is Beam 1 in Beam set 2, the user-side device considers that the beam set scheduled to the user-side device needs to be switched to Beam set 1. The user-side device may switch the currently used beam set from Beam set 2 to Beam set 1 at the time instance when the beam indication information indicating Beam 1 in Beam set 2 is received, and the user-side device may also switch the currently used beam set from Beam set 2 to Beam set 1 at the time instance when the specified condition is satisfied.

Optionally, as an example, the above-mentioned specified condition is a condition that the user-side device transmits response information related to the first indication information to the network-side device, for example, Acknowledgement (ACK) information. Optionally, the above-mentioned specified condition is a condition that a predetermined time interval elapses after the user-side device receives the first indication information.

Optionally, as an example, the foregoing specified condition is configured by the network-side device for the user-side device or is specified by a protocol.

Since the beam indication information is usually transmitted in a control channel of the physical layer, the method in some embodiments of the present disclosure may further reduce high-layer signaling overhead. The beam indication information implicitly indicates the beam set scheduled to the user-side device, which may reduce a bit overhead for Downlink Control Information (DCI) of the physical layer.

Second Example: the first indication information is a Rank Indication (RI)

In S110, the first indication information is the RI; correspondingly, in S120, the user-side device determines, according to mapping relationship between the RI and a spatial characteristic parameter set, the spatial characteristic parameter set scheduled to the user-side device.

Figure 3:
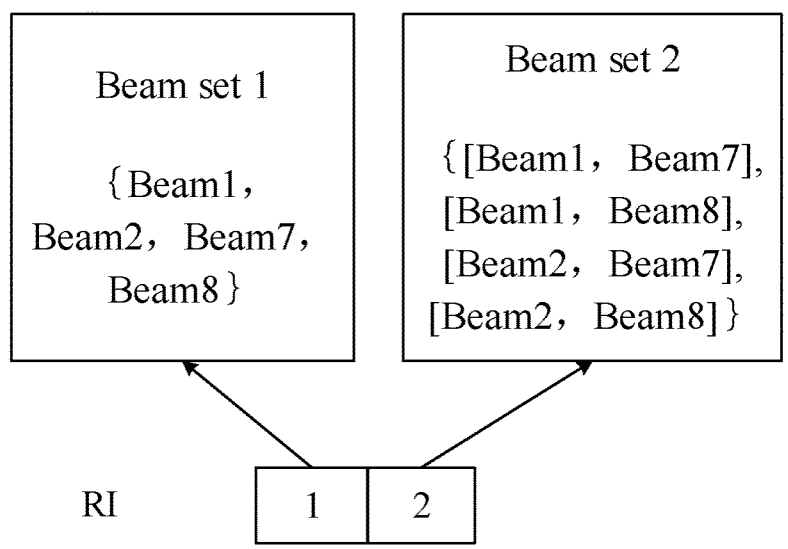
FIG. 3 is a second schematic diagram illustrating a method of indicating a spatial characteristic parameter set according to some embodiments of the present disclosure.

Taking, as an example, a case that the spatial characteristic parameter set includes a beam set, as shown in FIG. 3, Beam set 1 includes Beam 1, Beam 2, Beam 7, and Beam 8. The Beam set 2 includes Beam group [Beam 1, Beam 7], Beam group [Beam 1, Beam 8], Beam group [Beam 2, Beam 7] and Beam group [Beam 2, Beam 8]. If the rank indication is 1, it is implicitly indicated that Beam set 1 is scheduled to the user-side device; if the rank indication is 2, it is implicitly indicated that Beam set 2 is scheduled to the user-side device.

Further, the user-side device receives spatial characteristic parameter indication information transmitted by the network-side device, wherein the spatial characteristic parameter indication information is used to directly indicate a spatial characteristic parameter scheduled to the user-side device in the spatial characteristic parameter set. That is, in a case that the spatial characteristic parameter set includes the beam set, the spatial characteristic parameter indication information is beam indication information, the beam indication information is used to directly indicate a beam scheduled to the user-side device in the beam set. In a case that the spatial characteristic parameter set includes the precoding matrix set, the spatial characteristic parameter indication information is precoding matrix indication information, the precoding matrix indication information is used to directly indicate a precoding matrix scheduled to the user-side device in the precoding matrix set.

Taking, as an example, a case that the spatial characteristic parameter set includes the beam set shown in FIG. 3, the user-side device receives the beam indication information transmitted by the network-side device, the beam indication information is used to directly indicate a beam scheduled to the user-side device in the beam set, and the user-side device determines, according to the beam indication information, the beam scheduled to the user-side device. For example, the beam indication information indicates a beam by using 2 bits. If the beam set implicitly indicated by the first indication information is Beam set 1, the correspondence relation between the beam indication information and the beam may be: "00" used for indicating Beam 1, "01" used for indicating Beam 2, "10" used for indicating Beam 7, and "11" used for indicating Beam 8. If the beam set implicitly indicated by the first indication information is Beam set 2, the correspondence relation between the beam indication information and the beam may be: "00" used for indicating Beam group [Beam 1, Beam 7], and "01" used for indicating Beam group [Beam 1, Beam 8], "10" used for indicating Beam group [Beam 2, Beam 7], and "11" used for indicating Beam group [Beam 2, Beam 8].

Optionally, as an example, in a case that the first indication information is a rank indication, the spatial characteristic parameter set implicitly indicated by the first indication information is only in effect within a current schedule.

Optionally, as an example, in a case that the first indication information is a rank indication, the spatial characteristic parameter set implicitly indicated by the first indication information takes effect at a time instance when the user-side device receives the first indication information, or takes effect after the user-side device transmits ACK information related to the first indication information to the network device, or takes effect at a time instance which has a predetermined time interval between the time instance and a time instance when the user-side device receives the first indication information.

Third Example: the first indication information is information of a resource location of a Physical Downlink Control Channel (PDCCH)

In S110, the first indication information is information of a resource location of a PDCCH, and the user-side device determines the first indication information according to the resource location of the received PDCCH. Correspondingly, in S120, the user-side device determines, according to mapping relationship between the resource location of the PDCCH and the spatial characteristic parameter set, a transmission set scheduled to the user-side device. That is, the network-side device and the user-side device agree to implicitly indicate, through the resource location of the PDCCH, a spatial characteristic parameter set scheduled to the user-side device.

In some embodiments of the present disclosure, the resource location of the PDCCH includes a location of a Symbol and/or a location of a Control Resource Set (CORESET).

Figure 4:
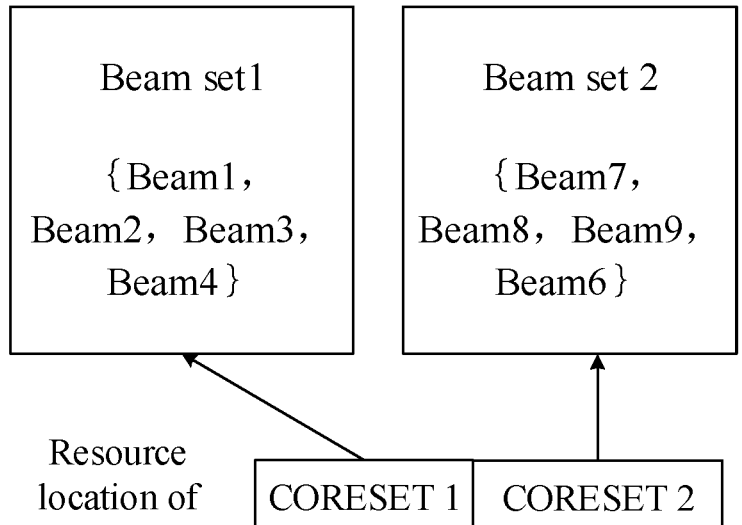
FIG. 4 is a third schematic diagram illustrating a method of indicating a spatial characteristic parameter set according to some embodiments of the present disclosure.

Taking, as an example, a case that the spatial characteristic parameter set includes a beam set, as shown in FIG. 4, Beam set 1 includes Beam 1, Beam 2, Beam 3, and Beam 4, and Beam set 2 includes Beam 7, Beam 8, Beam 9, and Beam 6. Taking, as an example, a case that the resource location of the PDCCH is a location of the CORESET, if the PDCCH blindly detected by the user-side device is located in a CORESET 1 within a Slot, the user-side device determines a beam set scheduled to the user-side device is Beam set 1. If the PDCCH blindly detected by the user-side device is located in a CORESET 2 in a slot, the user-side device determines a beam set scheduled to the user-side device is Beam set 2. In a multi-antenna (multi-beam) communication scenario, if a first PDCCH blindly detected by a user-side device is located in the CORESET 1 and the second PDCCH is located in the CORESET 2 within a slot, the user-side device determines that a beam set corresponding to the first PDCCH implicitly indicated by the resource location of the PDCCH is Beam set 1, and the beam set corresponding to the second PDCCH is Beam set 2.

Further, the user-side device receives the beam indication information transmitted by the network-side device, the beam indication information is used to directly indicate a beam scheduled to the user-side device in the beam set, and the user-side device determines, according to the beam indication information, the beam scheduled to the user-side device. For example, the beam indication information indicates a beam by using 2 bits. If the beam set implicitly indicated by the first indication information is Beam set 1, the correspondence relation between the beam indication information and the beam may be: "00" used for indicating Beam 1, "01" used for indicating Beam 2, "10" used for indicating Beam 3, and "11" used for indicating Beam 4. If the beam set implicitly indicated by the first indication information is Beam set 2, the correspondence relation between the beam indication information and the beam may be: "00" used for indicating Beam 7, "01" used for indicating Beam 8, "10" used for indicating Beam 9, and "11" used for indicating Beam 6.

Optionally, as an example, in a case that the first indication information is the information of the resource location of the PDCCH, the spatial characteristic parameter set implicitly indicated by the first indication information is only in effect within the current schedule.

Optionally, as an example, in a case that the first indication information is the information of the resource location of the PDCCH, the spatial characteristic parameter set implicitly indicated by the first indication information takes effect at a time instance when the user-side device receives the first indication information, or takes effect after the user-side device transmits ACK information related to the first indication information to the network device, or takes effect at a time instance which has a predetermined time interval between the time instance and a time instance when the user-side device receives the first indication information.

It should be noted that, in description of the First to Third Examples, taking, as an example, the case that the spatial characteristic parameter set includes a beam set is merely for convenience of description, rather than to limit the protection scope of some embodiments of the disclosure. According to the specific embodiments in which the spatial characteristic parameter set includes a beam set, a person skilled in the art without any creative works may implement an indication of a beam set and/or precoding matrix set in scenarios where the spatial characteristic parameter set includes a beam set and a precoding matrix set, and the spatial characteristic parameter set includes a precoding matrix set.

Figure 5:
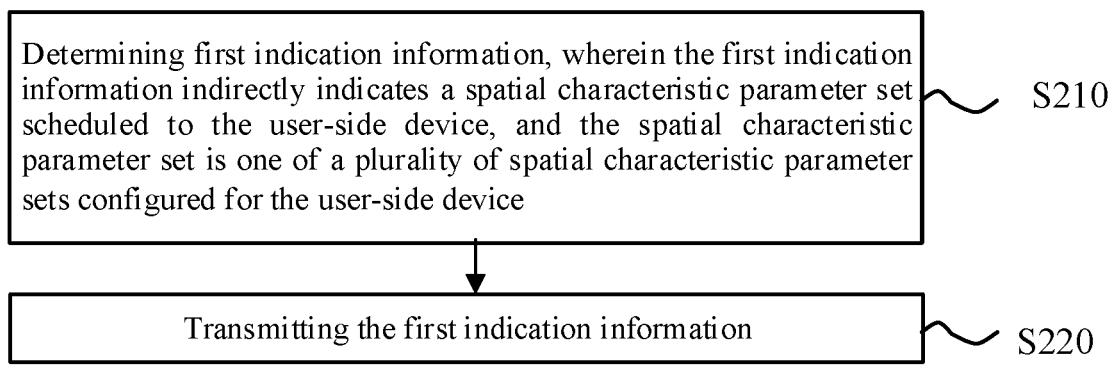
FIG. 5 is a second schematic flowchart illustrating a method of indicating a spatial characteristic parameter set according to some embodiments of the present disclosure.

The method of indicating a spatial characteristic parameter set according to some embodiments of the present disclosure has been described in detail from the user-side device side in combination with FIG. 1 to FIG. 4, and the method of indicating a spatial characteristic parameter set according to some embodiments of the present disclosure will be described in detail below from the network-side device side with reference to FIG. 5. It should be understood that an interaction between the user-side device and the network-side device described from the network-side device side is the same as the description made from the user-side device side. To avoid repetition, relevant description is appropriately omitted. As shown in FIG. 5, a method 200 includes steps S210 to S220.

S210: determining first indication information, wherein the first indication information indirectly indicates a spatial characteristic parameter set scheduled to the user-side device, and the spatial characteristic parameter set is one of a plurality of spatial characteristic parameter sets configured for the user-side device.

S220: transmitting the first indication information.

According to the method of indicating a spatial characteristic parameter set of some embodiments of the present disclosure, the first indication information determined by the network-side device indirectly indicates a spatial characteristic parameter set scheduled to the user-side device. Therefore, it is unnecessary for the network-side device to indicate, through special information, the spatial characteristic parameter set scheduled to the user-side device, which may reduce signaling overhead caused by the indication of the spatial characteristic parameter.

In some embodiments of the present disclosure, optionally, the spatial characteristic parameter set includes a beam set and/or a precoding matrix set.

In some embodiments of the present disclosure, optionally, the spatial characteristic parameter set includes at least one set element, and the set element is a spatial characteristic parameter group, and the spatial characteristic parameter group includes at least one spatial characteristic parameter.

In some embodiments of the present disclosure, optionally, there is an identical set element in different spatial characteristic parameter sets.

In some embodiments of the present disclosure, optionally, the spatial characteristic parameter set includes the beam set, the first indication information is beam indication information, the beam indication information is used to directly indicate a beam group scheduled to the user-side device in the beam set, the beam indication information indirectly indicates, through the mapping relationship between the beam indication information and the beam set, the beam set scheduled to the user-side device.

In some embodiments of the present disclosure, optionally, the spatial characteristic parameter set includes the precoding matrix set, the first indication information is precoding matrix indication information, the precoding matrix indication information is used to directly indicate a precoding matrix group scheduled to the user-side device in the precoding matrix set, the precoding matrix indication information indirectly indicates, through mapping relationship between the precoding matrix indication information and the precoding matrix set, the precoding matrix set scheduled to the user-side device.

In some embodiments of the present disclosure, optionally, the first indication information is a rank indication (RI), the RI indirectly indicates, through mapping relationship between the RI and the spatial characteristic parameter set, the spatial characteristic parameter set scheduled to the user-side device.

In some embodiments of the present disclosure, optionally, the first indication information is information of a resource location of a Physical Downlink Control Channel (PDCCH).

S220 specifically includes: transmitting the PDCCH, and indirectly indicating, through mapping relationship between a resource location of the PDCCH and a spatial characteristic parameter set, the spatial characteristic parameter set scheduled to the user-side device.

In some embodiments of the present disclosure, optionally, the resource location of the PDCCH includes a location of a Symbol and/or a location of a Control Resource Set (CORESET).

In some embodiments of the present disclosure, optionally, any beam set among a plurality of beam sets is associated with another beam set through a specific beam group in the beam set; wherein the beam indication information indirectly indicating, through the mapping relationship between the beam indication information and the beam set, the beam set scheduled to the user-side device includes: in a case that the beam group indicated by the beam indication information is a non-specific beam group in a first beam set, the beam set scheduled to the user-side device being the first beam set; in a case that the beam group indicated by the beam indication information is a first specific beam group in a second beam set, the beam set scheduled to the user-side device being a beam set associated with the second beam set through the beam group indicated by the beam indication information.

In some embodiments of the present disclosure, optionally, any precoding matrix set among a plurality of precoding matrix sets is associated with another precoding matrix set through a specific precoding matrix group in the precoding matrix set.

The precoding matrix indication information indirectly indicating, through the mapping relationship between the precoding matrix indication information and the precoding matrix set, the precoding matrix set scheduled to the user-side device includes: in a case that the precoding matrix group indicated by the precoding matrix indication information is a non-specific precoding matrix group in a first precoding matrix set, the precoding matrix set scheduled to the user-side device being the first precoding matrix set; in a case that the precoding matrix group indicated by the precoding matrix indication information is a first specific precoding matrix group in a second precoding matrix set, the precoding matrix set scheduled to the user-side device being a precoding matrix set associated with the second precoding matrix set through the precoding matrix group indicated by the precoding matrix indication information.

In some embodiments of the present disclosure, optionally, the spatial characteristic parameter set scheduled to the user-side device indicated by the first indication information takes effect at a time instance when a specified condition is satisfied, or takes effect at a current time instance.

In some embodiments of the present disclosure, optionally, the specified condition includes receiving response information related to the first indication information and transmitted by the user-side device; or a predetermined time interval lapsing from transmitting the first indication information.

In some embodiments of the present disclosure, optionally, the spatial characteristic parameter set scheduled to the user-side device and indicated by the first indication information is in effect in a current scheduling.

In some embodiments of the present disclosure, optionally, after transmitting the first indication information, the network-side device further transmits the spatial characteristic parameter indication information to the user-side device, wherein the spatial characteristic parameter indication information is used to directly indicate a spatial characteristic parameter scheduled to the user-side device in the spatial characteristic parameter set.

In some embodiments of the present disclosure, the method of indicating a spatial characteristic parameter set according to some embodiments of the present disclosure is described above in detail in combination with FIG. 1 to FIG. 5, and a user-side device according to some embodiments of the present disclosure will be described in detail below with reference to FIG. 6.

Figure 6:
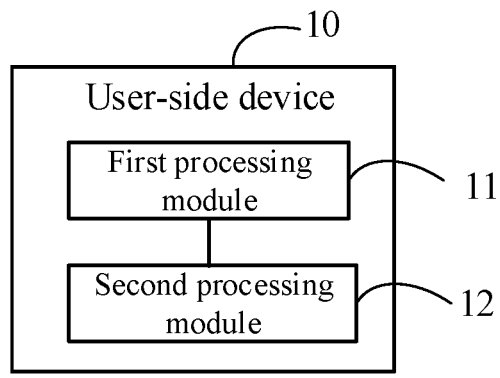
FIG. 6 is a first schematic diagram illustrating a structure of a user-side device according to some embodiments of the present disclosure.

FIG. 6 illustrates a user-side device according to some embodiments of the present disclosure. As shown in FIG. 6, the user-side device 10 includes: a first processing module 11, used to acquire first indication information, wherein the first indication information indirectly indicates a spatial characteristic parameter set scheduled to the user-side device, and the spatial characteristic parameter set is one of a plurality of spatial characteristic parameter sets configured for the user-side device; a second processing module 12, used to determine, according to the first indication information, the spatial characteristic parameter set scheduled to the user-side device.

The first indication information acquired by the user-side device according to some embodiments of the present disclosure indirectly indicates a spatial characteristic parameter set scheduled to the user-side device. Therefore, it is unnecessary for the network-side device to indicate, through special information, the spatial characteristic parameter set scheduled to the user-side device, and may reduce signaling overhead caused by an indication of the spatial characteristic parameter.

Optionally, as an example, the spatial characteristic parameter set includes a beam set and/or a precoding matrix set.

Optionally, as an example, the spatial characteristic parameter set includes at least one set element, and the set element is a spatial characteristic parameter group, and the spatial characteristic parameter group includes at least one spatial characteristic parameter.

Optionally, as an example, there is an identical set element in different spatial characteristic parameter sets.

Optionally, as an example, the spatial characteristic parameter set includes the beam set, the first indication information is beam indication information, the beam indication information is used to directly indicate a beam group scheduled to the user-side device in the beam set.

The second processing module 12 is specifically used to: determine, according to the mapping relationship between the beam indication information and the beam set, the beam set scheduled to the user-side device.

Optionally, as an example, the spatial characteristic parameter set includes the precoding matrix set, the first indication information is precoding matrix indication information, the precoding matrix indication information is used to directly indicate a precoding matrix scheduled to the user-side device in the precoding matrix set.

The second processing module 12 is specifically used to: determine, according to the mapping relationship between the precoding matrix indication information and the precoding matrix set, the precoding matrix set scheduled to the user-side device.

Optionally, as an example, the first indication information is a rank indication (RI), wherein the second processing module 12 is specifically used to: determine, according to a mapping relationship between the RI and the spatial characteristic parameter set, the spatial characteristic parameter set scheduled to the user-side device.

Optionally, as an example, the first indication information is information of a resource location of a Physical Downlink Control Channel (PDCCH), wherein the first processing module 11 is specifically used to: determine the first indication information according to the resource location of the received PDCCH; wherein the second processing module 12 is specifically used to: determine, according to mapping relationship between the resource location of the PDCCH and the spatial characteristic parameter set, the spatial characteristic parameter set scheduled to the user-side device.

Optionally, as an example, the resource location of the PDCCH includes a location of a symbol and/or a location of a Control Resource Set (CORESET).

Optionally, as an example, any beam set among a plurality of beam sets is associated with another beam set through a specific beam group in the beam set; wherein the second processing module 12 is specifically used to: determine, in a case that the beam group indicated by the beam indication information is a non-specific beam group in a first beam set, that the beam set scheduled to the user-side device is the first beam set; determine, in a case that the beam group indicated by the beam indication information is a specific beam group in a second beam set, that the beam set scheduled to the user-side device is a beam set associated with the second beam set through the beam group indicated by the beam indication information.

Optionally, as an example, any precoding matrix set among a plurality of precoding matrix sets is associated with another precoding matrix set through a specific precoding matrix group therein; wherein the second processing module 12 is specifically used to: determine, in a case that the precoding matrix group indicated by the precoding matrix indication information is a non-specific precoding matrix group in a first precoding matrix set, that the precoding matrix set scheduled to the user-side device is the first precoding matrix set; determine, in a case that the precoding matrix group indicated by the precoding matrix indication information is a specific precoding matrix group in a second precoding matrix set, that the precoding matrix set scheduled to the user-side device is a precoding matrix set associated with the second precoding matrix set through the precoding matrix group indicated by the precoding matrix indication information.

Optionally, as an example, the spatial characteristic parameter set scheduled to the user-side device and indicated by the first indication information takes effect at a time instance when a specified condition is satisfied, or takes effect at a current time instance.

Optionally, as an example, the specified condition includes transmitting response information related to the first indication information to a network-side device; or a predetermined time interval lapsing from receiving the first indication information.

Optionally, as an example, the spatial characteristic parameter set scheduled to the user-side device and indicated by the first indication information is in effect in a current scheduling.

Optionally, as an example, after determining, according to the first indication information, the spatial characteristic parameter set scheduled to the user-side device, the second processing module 12 is further used to: receive spatial characteristic parameter indication information, wherein the spatial characteristic parameter indication information is used to directly indicate a spatial characteristic parameter scheduled to the user-side device in the spatial characteristic parameter set; determine, according to the spatial characteristic parameter indication information, a spatial characteristic parameter scheduled to the user-side device in the spatial characteristic parameter set.

Description of the user-side device according to some embodiments of the present disclosure may be obtained by referring to processes of the method 100 corresponding to some embodiments of the present disclosure, and each unit/module in the user-side device and other operations and/or functions described above are respectively for implementing the corresponding processes in the method 100, which are not repeated here for brevity.

Figure 7:
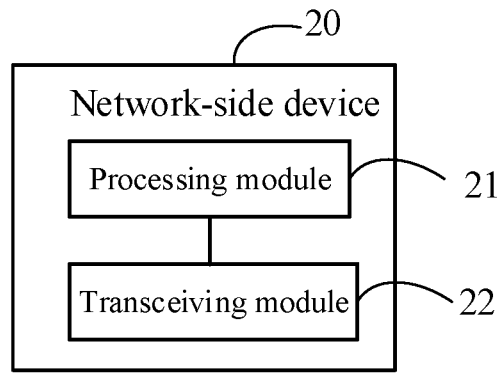
FIG. 7 is a first schematic diagram illustrating a structure of a network-side device according to some embodiments of the present disclosure.

FIG. 7 is a schematic diagram illustrating a structure of a network-side device according to some embodiments of the present disclosure, as shown in FIG. 7, a network-side device 20 includes: a processing module 21, used to determine first indication information, wherein the first indication information indirectly indicates a spatial characteristic parameter set scheduled to the user-side device, and the spatial characteristic parameter set is one of a plurality of spatial characteristic parameter sets configured for the user-side device; a transceiving module 22, used to transmit the first indication information.

The first indication information transmitted by the network-side device to the user-side device according to some embodiments of the present disclosure indirectly indicates a spatial characteristic parameter set scheduled to the user-side device. Therefore, it is unnecessary for the network-side device to indicate, through special information, the spatial characteristic parameter set scheduled to the user-side device, which may reduce the signaling overhead caused by an indication of the spatial characteristic parameter.

Optionally, as an example, the spatial characteristic parameter set includes a beam set and/or a precoding matrix set.

Optionally, as an example, the spatial characteristic parameter set includes at least one set element, and the set element is a spatial characteristic parameter group, and the spatial characteristic parameter group includes at least one spatial characteristic parameter.

Optionally, as an example, there is an identical set element in different spatial characteristic parameter sets.

Optionally, as an example, the spatial characteristic parameter set includes the beam set, the first indication information is beam indication information, the beam indication information is used to directly indicate a beam group scheduled to the user-side device in the beam set, the beam indication information indirectly indicates, through mapping relationship between the beam indication information and the beam set, the beam set scheduled to the user-side device.

Optionally, as an example, the spatial characteristic parameter set includes the precoding matrix set, the first indication information is precoding matrix indication information, the precoding matrix indication information is used to directly indicate a precoding matrix group scheduled to the user-side device in the precoding matrix set, the precoding matrix indication information indirectly indicates, through mapping relationship between the precoding matrix indication information and the precoding matrix set, the precoding matrix set scheduled to the user-side device.

Optionally, as an example, the first indication information is a rank indication (RI), the RI indirectly indicates, through mapping relationship between the RI and the spatial characteristic parameter set, the spatial characteristic parameter set scheduled to the user-side device.

Optionally, as an example, the first indication information is information of a resource location of a Physical Downlink Control Channel (PDCCH), wherein the transceiving module 22 is specifically used to: transmit the PDCCH, wherein mapping relationship between the resource location of the PDCCH and the spatial characteristic parameter set indirectly indicates the spatial characteristic parameter set scheduled to the user-side device.

Optionally, as an example, the resource location of the PDCCH includes a location of a Symbol and/or a location of a Control Resource Set (CORESET).

Optionally, as an example, any one beam set among a plurality of beam sets is associated with another beam set through a specific beam group in the beam set; wherein the beam indication information indirectly indicating, through the mapping relationship between the beam indication information and the beam set, the beam set scheduled to the user-side device includes: in a case that the beam group indicated by the beam indication information is a non-specific beam group in a first beam set, the beam set scheduled to the user-side device being the first beam set; in a case that the beam group indicated by the beam indication information is a first specific beam group in a second beam set, the beam set scheduled to the user-side device being a beam set associated with the second beam set through the beam group indicated by the beam indication information.

Optionally, as an example, any precoding matrix set among a plurality of precoding matrix sets is associated with another precoding matrix set through a specific precoding matrix group in the precoding matrix set; wherein the precoding matrix indication information indirectly indicating, through the mapping relationship between the precoding matrix indication information and the precoding matrix set, the precoding matrix set scheduled to the user-side device includes: in a case that the precoding matrix group indicated by the precoding matrix indication information is a non-specific precoding matrix group in a first precoding matrix set, the precoding matrix set scheduled to the user-side device being the first precoding matrix set; in a case that the precoding matrix group indicated by the precoding matrix indication information is a first specific precoding matrix group in a second precoding matrix set, the precoding matrix set scheduled to the user-side device being a precoding matrix set associated with the second precoding matrix set through the precoding matrix group indicated by the precoding matrix indication information.

Optionally, as an example, the spatial characteristic parameter set scheduled to the user-side device and indicated by the first indication information takes effect at a time instance when a specified condition is satisfied, or takes effect at a current time instance.

Optionally, as an example, the specified condition includes receiving response information related to the first indication information and transmitted by the user-side device; or a predetermined time interval lapsing from transmitting the first indication information.

Optionally, as an example, the spatial characteristic parameter set scheduled to the user-side device and indicated by the first indication information is in effect in a current scheduling.

Optionally, as an example, after transmitting the first indication information, the transceiving module 22 further used to: transmit spatial characteristic parameter indication information, wherein the spatial characteristic parameter indication information is used to directly indicate a spatial characteristic parameter scheduled to the user-side device in the spatial characteristic parameter set.

Description of the network-side device according to some embodiments of the present disclosure may be obtained by referring to processes of the method 200 corresponding to some embodiments of the present disclosure, and each unit/module in the network-side device and the other operations and/or functions described above are respectively for implementing the corresponding processes in the method 200, which are not repeated here for brevity.

Figure 8:
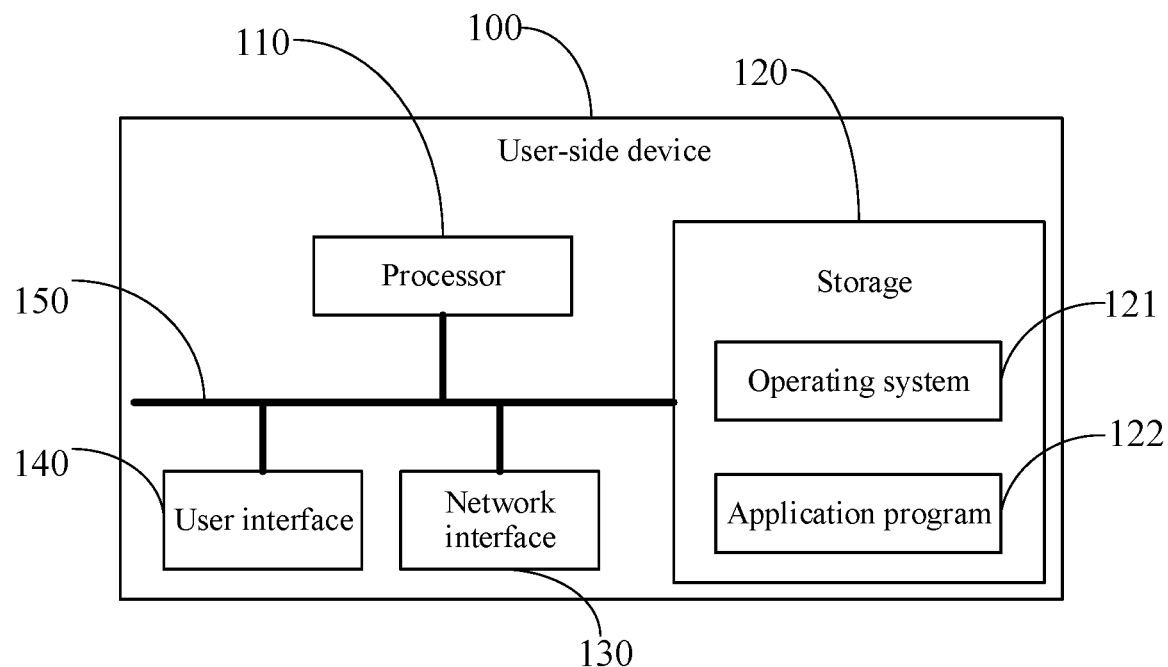
FIG. 8 is a second schematic diagram illustrating a structure of a user-side device according to some embodiments of the present disclosure.

FIG. 8 is a schematic diagram illustrating a structure of a user-side device according to another embodiment of the present disclosure, as shown in FIG. 8, a user-side device 100 includes: at least one processor 110, a storage 120, at least one network interface 130 and a user interface 140. The various components in the user-side device 100 are coupled together by a bus system 150. It will be appreciated that the bus system 150 is used to enable connection communication among these components. The bus system 150 includes a power bus, a control bus, a status signal bus and a data bus. However, for clarity of description, various buses are labeled as the bus system 150 in FIG. 8.

The user interface 140 may include a display, a keyboard, or a pointing device (e.g., a mouse), a trackball, a touchpad, or a touch screen, etc.

It is to be understood that the storage 120 in some embodiments of the present disclosure can be either a volatile storage or a non-volatile storage, or can include both the volatile storage and the non-volatile storage. The non-volatile storage may be a Read-Only Memory (ROM), a Programmable ROM (PROM), an Erasable PROM (EPROM), or an Electrically EPROM (EEPROM) or a flash memory. The volatile storage can be a Random Access Memory (RAM) that acts as an external cache. By way of example and not limitation, many forms of RAM are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). The storage 120 of the systems and methods described in some embodiments of the present disclosure is intended to include, but is not limited to, these and any other suitable types of memory.

In some embodiments, the storage 120 stores the following elements, executable modules or data structures, or a subset thereof, or an extended set thereof: an operating system 121 and an application program 122.

The operating system 121 includes various system programs, such as a framework layer, a core library layer, a driver layer, and the like, for implementing various basic services and processing hardware-based tasks. The application program 122 includes various application programs, such as a Media Player, a Browser, and the like, for implementing various application services. A program implementing the methods of some embodiments of the present disclosure can be included in the application program 122.

In some embodiments of the present disclosure, the user-side device 100 further includes: a computer program stored in the storage 120 and executable by the processor 110. In a case that the computer program is executed by the processor 110, the processor 110 is used to implement the following steps: acquiring first indication information, wherein the first indication information indirectly indicates a spatial characteristic parameter set scheduled to the user-side device, and the spatial characteristic parameter set is one of a plurality of spatial characteristic parameter sets configured for the user-side device; determining, according to the first indication information, the spatial characteristic parameter set scheduled to the user-side device.

The above method disclosed in some embodiments of the present disclosure may be applied to the processor 110 or implemented by the processor 110. The processor 110 may be an integrated circuit chip having a processing capability of signals. During an implementation process, steps of the method may be realized in form of integrated logical circuits of hardware in the processor 110, or in form of instructions in software. The processor 110 may be a general purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. Various methods, steps, and logical block diagrams disclosed in some embodiments of the present disclosure may be implemented or carried out. The general purpose processor may be a microprocessor, any conventional processor, etc. The steps of the methods disclosed with reference to the embodiments of the present disclosure may be embodied in a form of hardware in a decoding processor, or performed by a combination of a hardware in the decoding processor and software modules. The software modules may reside in a well-established computer readable storage medium in the art, such as a RAM, a flash memory, a ROM, a PROM or an EEPROM, a register. The computer readable storage medium resides in the storage 120. The processor 110 reads information from the storage 120 and performs the steps of the methods with hardware of the processor 110. Specifically, a computer program is stored on the computer readable storage medium. In a case that the computer program is executed by the processor 110, the processor 110 implements each step of method embodiments in the method 100 described above.

It is to be understood that the embodiments described in some embodiments of the present disclosure may be implemented in hardware, software, firmware, middleware, microcodes, or any combination thereof. For hardware implementation, processing units may be implemented in one or more of Application Specific Integrated Circuits (ASIC), Digital Signal Processors (DSP), DSP devices (DSPD), Programmable Logic Device (PLD), Field Programmable Gate Array (FPGA), a general purpose processor, a controller, a microcontroller, a microprocessor, other electronic units used to perform the functions described in the present disclosure, or a combination thereof.

For software implementation, techniques described in some embodiments of the present disclosure may be implemented by modules (e.g., processes, functions, etc.) that perform the functions described in some embodiments of the present disclosure. The software codes can be stored in the storage and executed by the processor. The storage can be implemented within the processor or external to the processor.

Optionally, the spatial characteristic parameter set includes the beam set, the first indication information is beam indication information, the beam indication information is used to directly indicate a beam group scheduled to the user-side device in the beam set. In a case that the computer program is executed by the processor 110, the processor 110 implements the following step: determining, according to mapping relationship between the beam indication information and the beam set, the beam set scheduled to the user-side device.

Optionally, the spatial characteristic parameter set includes the precoding matrix set, the first indication information is precoding matrix indication information, the precoding matrix indication information is used to directly indicate a precoding matrix group scheduled to the user-side device in the precoding matrix set. In a case that the computer program is executed by the processor 110, the processor 110 implements the following step: determining, according to mapping relationship between the precoding matrix indication information and the precoding matrix set, the precoding matrix set scheduled to the user-side device.

Optionally, the first indication information is a rank indication (RI). In a case that the computer program is executed by the processor 110, the processor 110 implements the following step: determining, according to mapping relationship between the RI and the spatial characteristic parameter set, the spatial characteristic parameter set scheduled to the user-side device.

Optionally, the first indication information is information of a resource location of a Physical Downlink Control Channel (PDCCH). In a case that the computer program is executed by the processor 110, the processor 110 implements the following steps: determining the first indication information according to the resource location of the received PDCCH; determining, according to mapping relationship between the resource location of the PDCCH and the spatial characteristic parameter set, the spatial characteristic parameter set scheduled to the user-side device.

Optionally, any beam set among a plurality of spatial characteristic parameter sets is associated with another beam set through a specific beam group in the beam set. In a case that the computer program is executed by the processor 110, the processor 110 implements the following steps: determining, in a case that the beam group indicated by the beam indication information is a non-specific beam group in a first beam set, that the beam set scheduled to the user-side device is the first beam set; determining, in a case that the beam group indicated by the beam indication information is a specific beam group in a second beam set, that the beam set scheduled to the user-side device is a beam set associated with the second beam set through the beam group indicated by the beam indication information.

Optionally, any precoding matrix set among a plurality of precoding matrix sets is associated with another precoding matrix set through a specific precoding matrix group in the precoding matrix set. In a case that the computer program is executed by the processor 110, the processor 110 implements the following steps: determining, in a case that the precoding matrix group indicated by the precoding matrix indication information is a non-specific precoding matrix group in a first precoding matrix set, that the precoding matrix set scheduled to the user-side device is the first precoding matrix set; determining, in a case that the precoding matrix group indicated by the precoding matrix indication information is a specific precoding matrix group in a second precoding matrix set, that the precoding matrix set scheduled to the user-side device is a precoding matrix set associated with the second precoding matrix set through the precoding matrix group indicated by the precoding matrix indication information.

Optionally, after determining, according to the first indication information, the spatial characteristic parameter set scheduled to the user-side device, and in a case that the computer program is executed by the processor 110, the processor 110 implements the following steps: receiving spatial characteristic parameter indication information, wherein the spatial characteristic parameter indication information is used to directly indicate a spatial characteristic parameter scheduled to the user-side device in the spatial characteristic parameter set; determining, according to the spatial characteristic parameter indication information, the spatial characteristic parameter scheduled to the user-side device in the spatial characteristic parameter set.

Optionally, as an example, the spatial characteristic parameter set includes at least one set element, and the set element is a spatial characteristic parameter group, and the spatial characteristic parameter group includes at least one spatial characteristic parameter.

Optionally, as an example, there is an identical set element in different spatial characteristic parameter sets.

Optionally, as an example, the resource location of the PDCCH includes a location of a Symbol and/or a location of a Control Resource Set (CORESET).

Optionally, as an example, the spatial characteristic parameter set scheduled to the user-side device and indicated by the first indication information takes effect at a time instance when a specified condition is satisfied, or takes effect at a current time instance.

Optionally, as an example, the specified condition includes transmitting response information related to the first indication information to a network-side device; or a predetermined time interval lapsing from receiving the first indication information.

Optionally, as an example, the spatial characteristic parameter set scheduled to the user-side device and indicated by the first indication information is in effect in a current scheduling.

The first indication information acquired by the user-side device according to some embodiments of the present disclosure indirectly indicates a spatial characteristic parameter set scheduled to the user-side device. Therefore, it is unnecessary for the network-side device to indicate, through special information, the spatial characteristic parameter set scheduled to the user-side device, and may reduce signaling overhead caused by an indication of the spatial characteristic parameter.

Description of the user-side device 100 according to some embodiments of the present disclosure may be obtained by referring to the user-side device 10 corresponding to some embodiments of the present disclosure, and each unit/module in the user-side device and the other operations and/or functions described above are respectively for implementing corresponding processes in the method 100, which are not repeated here for brevity.

Figure 9:
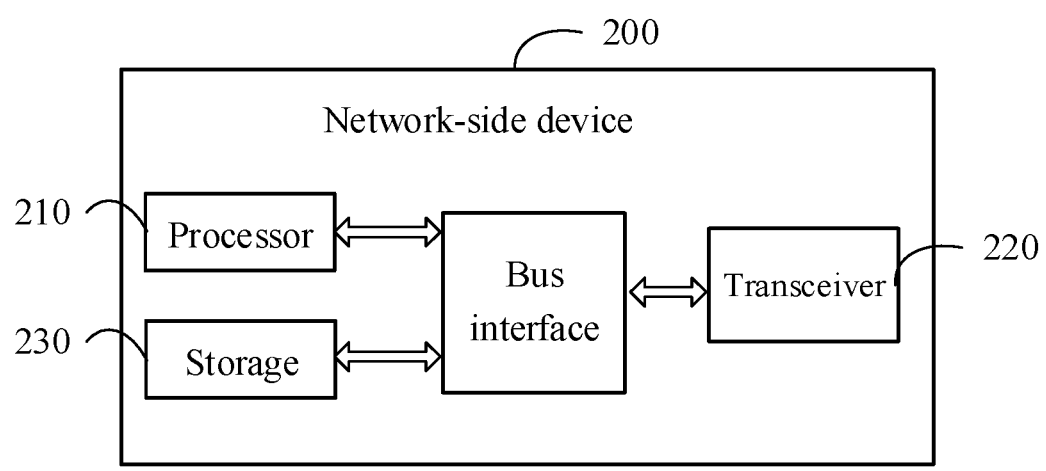
FIG. 9 is a second schematic diagram illustrating a structure of a network-side device according to some embodiments of the present disclosure.

FIG. 9 is a schematic diagram illustrating a structure of a network-side device according to another embodiment of the present disclosure, which may implement the details of the method of indicating a beam set in the method 200 and achieve the same effect. As shown in FIG. 9, the network-side device 200 includes: a processor 210, a transceiver 220, a storage 230 and a bus interface.

In some embodiments of the present disclosure, the network-side device 200 further includes: a computer program stored in the storage 230 and executable by the processor 210. In a case that the computer program is executed by the processor 210, the processor 110 implements the following step: determining first indication information, wherein the first indication information indirectly indicates a spatial characteristic parameter set scheduled to the user-side device, and the spatial characteristic parameter set is one of a plurality of spatial characteristic parameter sets configured for the user-side device; transmitting the first indication information.

In FIG. 9, a bus architecture may include any number of interconnected buses and bridges. Various circuits, specifically, one or more processors represented by the processor 210 and a storage represented by the storage 230, are linked together. The bus architecture may also link various other circuits such as peripherals, voltage regulators and power management circuits, which are well known in the art, and therefore a further description thereof is omitted herein. The bus interface provides interfaces. The transceiver 220 may be a plurality of elements, that is, includes a transmitter and a receiver, to provide units used to communicate with various other apparatuses over a transmission medium.

The processor 210 is responsible for managing the bus architecture and general processing, and the storage 230 can store data used by the processor 210 when performing operations.

Optionally, the first indication information is information of a resource location of a Physical Downlink Control Channel (PDCCH). In a case that the computer program is executed by the processor 210, the processor 210 implements the following step: transmitting the PDCCH, wherein mapping relationship between the resource location of the PDCCH and the spatial characteristic parameter set indirectly indicates the spatial characteristic parameter set scheduled to the user-side device.

Optionally, after transmitting the first indication information. In a case that the computer program is executed by the processor 210, the processor 210 implements the following step: transmitting spatial characteristic parameter indication information, wherein the spatial characteristic parameter indication information is used to directly indicate a spatial characteristic parameter scheduled to the user-side device in the spatial characteristic parameter set.

Optionally, as an example, the spatial characteristic parameter set includes at least one set element, and the set element is a spatial characteristic parameter group, and the spatial characteristic parameter group includes at least one spatial characteristic parameter.

Optionally, as an example, there is an identical set element in different spatial characteristic parameter sets.

Optionally, as an example, the spatial characteristic parameter set includes the beam set, the first indication information is beam indication information, the beam indication information is used to directly indicate a beam group scheduled to the user-side device in the beam set, the beam indication information indirectly indicates, through mapping relationship between the beam indication information and the beam set, the beam set scheduled to the user-side device.

Optionally, as an example, the spatial characteristic parameter set includes the precoding matrix set, the first indication information is precoding matrix indication information, the precoding matrix indication information is used to directly indicate a precoding matrix group scheduled to the user-side device in the precoding matrix set, the precoding matrix indication information indirectly indicates, through mapping relationship between the precoding matrix indication information and the precoding matrix set, the precoding matrix set scheduled to the user-side device.

Optionally, as an example, the first indication information is a rank indication (RI), the RI indirectly indicates, through mapping relationship between the RI and the spatial characteristic parameter set, the spatial characteristic parameter set scheduled to the user-side device.

Optionally, as an example, the resource location of the PDCCH includes a location of a Symbol and/or a location of a Control Resource Set (CORESET).

Optionally, as an example, any beam set among a plurality of beam sets is associated with another beam set through a specific beam group in the beam set.

The beam indication information, through the mapping relationship between the beam indication information and the beam set, indirectly indicating the beam set scheduled to the user-side device includes: in a case that the beam group indicated by the beam indication information is a non-specific beam group in a first beam set, the beam set scheduled to the user-side device being the first beam set; in a case that the beam group indicated by the beam indication information is a first specific beam group in a second beam set, the beam set scheduled to the user-side device being a beam set associated with the second beam set through the beam group indicated by the beam indication information.

Optionally, as an example, any precoding matrix set among a plurality of precoding matrix sets is associated with another precoding matrix set through a specific precoding matrix group in the precoding matrix set.

The precoding matrix indication information, through the mapping relationship between the precoding matrix indication information and the precoding matrix set, indirectly indicating the precoding matrix set scheduled to the user-side device includes: in a case that the precoding matrix group indicated by the precoding matrix indication information is a non-specific precoding matrix group in a first precoding matrix set, the precoding matrix set scheduled to the user-side device being the first precoding matrix set; in a case that the precoding matrix group indicated by the precoding matrix indication information is a first specific precoding matrix group in a second precoding matrix set, the precoding matrix set scheduled to the user-side device being a precoding matrix set associated with the second precoding matrix set through the precoding matrix group indicated by the precoding matrix indication information.

Optionally, as an example, the spatial characteristic parameter set scheduled to the user-side device and indicated by the first indication information takes effect at a time instance when a specified condition is satisfied, or takes effect at a current time instance.

Optionally, as an example, the specified condition includes receiving response information related to the first indication information and transmitted by the user-side device; or a predetermined time interval lapsing from transmitting the first indication information.

Optionally, as an example, the spatial characteristic parameter set scheduled to the user-side device indicated by the first indication information is in effect in a current scheduling.

The first indication information transmitted by the network-side device to the user-side device according to some embodiments of the present disclosure indirectly indicates a spatial characteristic parameter set scheduled to the user-side device. Therefore, it is unnecessary for the network-side device to indicate, through special information, the spatial characteristic parameter set scheduled to the user-side device, which may reduce the signaling overhead caused by an indication of the spatial characteristic parameter.

Description of the network-side device 200 according to some embodiments of the present disclosure may be obtained by referring to the network-side device 20 corresponding to some embodiments of the present disclosure, and each unit/module in the network-side device and the other operations and/or functions described above are respectively for implementing the corresponding processes in the method 200, which are not repeated here for brevity.

In the methods and the devices provided by the present disclosure, the first indication information indirectly indicates a spatial characteristic parameter set scheduled to a user-side device, that is, the network-side device indicates the spatial characteristic parameter set scheduled to the user-side device by way of an implicit indication. Therefore, according to the methods of some embodiments of the present disclosure, it is unnecessary for the network-side device to indicate, through special information, the spatial characteristic parameter set scheduled to the user-side device, which may reduce the signaling overhead caused by an indication of the spatial characteristic parameter.

A person skilled in the art may be aware that, exemplary units and algorithm steps described in connection with the embodiments disclosed herein may be implemented by electronic hardware or a combination of computer software and electronic hardware. Whether the functions are performed by hardware or software depends on particular applications and design constraint conditions of technical solutions. A person skilled in the art can use different methods to implement the described functions for different particular applications, but it should not be considered that the implementation goes beyond the scope of the present disclosure.

It may be clearly understood by a person skilled in the art that, for ease of description and conciseness, a detailed working process of the foregoing systems, devices, and units, may be obtained by reference to a corresponding process in the foregoing method embodiments, and details are not described herein again.

In the embodiments provided in the present disclosure, it should be understood that the disclosed systems, devices and methods may be implemented in other manners. For example, the described device embodiment is merely exemplary. For example, an unit division is merely a logical function division and there may exist another division in actual implementation. For example, a plurality of units or components may be combined or integrated into another system, or some features may be ignored or not performed. In addition, a mutual coupling or a direct coupling or communication connection shown or discussed may be an indirect coupling or a communication connection through some interfaces, devices or units, and may be in an electrical, mechanical or other form.

Units described as separate parts may or may not be physically separate, and parts displayed as units may or may not be physical units, that is, may be located in one position, or may be distributed on a plurality of network units. A part or all of the units may be selected according to actual needs to achieve objectives of the solutions of the embodiments of the present disclosure.

In addition, various functional units in various embodiments of the present disclosure may be integrated into one processing unit, or each of the units may exist alone physically, or two or more units may be integrated into one unit.

If the function is implemented in form of a software functional unit and sold or used as an independent product, the soft function unit may be stored in a computer readable storage medium. Based on such an understanding, an essential part or a part contributing to the prior art of technical solutions of the present disclosure, or a part of the technical solutions may be implemented in form of a software product. The computer software product is stored in a storage medium, and includes several instructions for instructing a computer device (which may be a personal computer, a server, or a network device) to perform all or a part of the steps of the methods described in the embodiments of the present disclosure. The above storage medium includes various media that can store program codes, such as a USB flash drive, a removable hard disk, a Read-Only Memory (ROM), a Random Access Memory (RAM), a magnetic disk, an optical disk or the like.

The computer readable storage medium described in the present disclosure may be a volatile storage medium or a non-volatile storage medium.

The aforementioned are merely specific implementations of the present disclosure, but the protection scope of the present disclosure is by no means limited thereto. Any modifications or substitutions that would easily occurred to those skilled in the art, without departing from the technical scope disclosed in the present disclosure, should be encompassed in the protection scope of the present disclosure. Therefore, the protection scope of the present disclosure is determined by the protection scope of the claims.

What is claimed is:

1. A method of indicating a spatial characteristic parameter set, performed by a user-side device and comprising:
acquiring first indication information, wherein the first indication information indirectly indicates a spatial characteristic parameter set scheduled to the user-side device, and the spatial characteristic parameter set is one of a plurality of spatial characteristic parameter sets configured for the user-side device; and determining, according to the first indication information, the spatial characteristic parameter set scheduled to the user-side device, wherein the spatial characteristic parameter set comprises a beam set and/or a recoding matrix set, wherein, the spatial characteristic parameter set comprises a beam set, the first indication information is beam indication information, the beam indication information is used to directly indicate a beam group scheduled to the user-side device in the beam set, determining, according to the first indication information, the spatial characteristic parameter set scheduled to the user-side device comprises, determining, according to manning relationship between beam indication information and a beam set, a beam set scheduled to the user-side device;

and/or, the spatial characteristic parameter set comprises a precoding matrix set, the first indication information is precoding matrix indication information, the precoding matrix indication information is used to directly indicate a precoding matrix group scheduled to the user-side device in the precoding matrix set: determining, according to the first indication information, the spatial characteristic parameter set scheduled to the user-side device comprises, determining, according to mapping relationship between precoding matrix indication information and a precoding matrix set, the precoding matrix set scheduled to the user-side device, wherein any set among a plurality of beam sets is associated with another beam set through a specific beam group in the beam set, determining, according to the mapping relationship between the beam indication information and the beam set, the beam set scheduled to the user-side device comprises:

determining, in a case that the beam group indicated by the beam indication information is a non-specific beam group in a first beam set, that the beam set scheduled to the user-side device is the first beam set;

determining, in a case that the beam group indicated by the beam indication information is a specific beam group in a second beam set, that the beam set scheduled to the user-side device is a beam set associated with the second beam set through the beam group indicated by the beam indication information, any precoding matrix set among a plurality of precoding matrix sets is associated with another precoding matrix set through a specific precoding matrix group in the precoding matrix, determining, according to the mapping relationship between the precoding matrix indication information and the precoding matrix set, the precoding matrix set scheduled to the user-side device comprises:

determining, in a case that the precoding matrix group indicated by the precoding matrix indication information is a non-specific precoding matrix group in a first precoding matrix set, that the precoding matrix set scheduled to the user-side device is the first precoding matrix set;

determining, in a case that the precoding matrix group indicated by the precoding matrix indication information is a specific precoding matrix group in a second precoding matrix set, that the precoding matrix set scheduled to the user-side device is a precoding matrix set associated with the second precoding matrix set through the precoding matrix group indicated by the precoding matrix indication information.

2. The method according to claim 1, wherein the spatial characteristic parameter set comprises at least one set element, the set element is a spatial characteristic parameter group, and the spatial characteristic parameter group comprises at least one spatial characteristic parameter.

3. The method according to claim 1, wherein, the first indication information is a rank indication (RI);

determining, according to the first indication information, the spatial characteristic parameter set scheduled to the user-side device comprises: determining, according to mapping relationship between an RI and a spatial characteristic parameter set, the spatial characteristic parameter set scheduled to the user-side device;

or, the first indication information is information of a resource of a physical downlink control channel (PDCCH);

acquiring the first indication information comprises: acquiring the information of the resource of a received PDCCH;

determining, according to the first indication information, the spatial characteristic parameter set scheduled to the user-side device comprises: determining, according to mapping relationship between the resource of the PDCCH and the spatial characteristic parameter set, the spatial characteristic parameter set scheduled to the user-side device.

4. The method according to claim 3, wherein, in a case that the first indication information is the information of the resource of the PDCCH, the resource of the PDCCH is a control resource set (CORESET).

5. The method according to claim 3, wherein, after determining, according to the first indication information, the spatial characteristic parameter set scheduled to the user-side device, the method further comprises:

receiving spatial characteristic parameter indication information, wherein the spatial characteristic parameter indication information is used to directly indicate a spatial characteristic parameter scheduled to the user-side device in the spatial characteristic parameter set;

determining, according to the spatial characteristic parameter indication information, the spatial characteristic parameter scheduled to the user-side device in the spatial characteristic parameter set.

6. A method of indicating a spatial characteristic parameter set, performed by a network-side device and comprising:

determining first indication information, wherein the first indication information indirectly indicates a spatial characteristic parameter set scheduled to the user-side device, and the spatial characteristic parameter set is one of a plurality of spatial characteristic parameter sets configured for the user-side device; and transmitting the first indication information, wherein the spatial characteristic parameter set comprises a beam set and/or a precoding matrix set, wherein, the spatial characteristic parameter set comprises the beam set, the first indication information is bean indication information, the beam indication information is used to directly indicate a beam group scheduled to the user-side deice in the beam set, the beam indication information indirectly indicates, through mapping relationship between beam indication information and a beam set, the beam set scheduled to the user-side device;

and/or, the spatial characteristic parameter set comprises the precoding matrix set, the first indication information is precoding matrix indication information, the precoding matrix indication information is used to directly indicate a precoding matrix group scheduled to the user-side device in the precoding matrix set, the precoding matrix indication information indirectly indicates, through mapping relationship between precoding matrix indication information and a precoding matrix set, the precoding matrix set scheduled to the user-side device, wherein, any beam set among a plurality of beam sets is associated with another beam set through a specific beam group in the beam set, the beam indication information, through the mapping relationship between beam indication information and a beam set, indirectly indicating the beam set scheduled to the user-side device comprises:

in a case that the beam group indicated by the beam indication information is a non-specific beam group in a first beam set, the beam set scheduled to the user-side device being the first beam set, in a case that the beam group indicated by the beam indication information is a first specific beam group in a second beam set, the beam set scheduled to the user-side device being a beam set associated with the second beam set through the beam group indicated by the beam indication information, any precoding matrix set among a plurality of precoding matrix sets is associated with another precoding matrix set through a specific precoding matrix group in the precoding matrix set;

the precoding matrix indication information indirectly indicating, through the mapping relationship between precoding matrix indication information and a precoding matrix set, the precoding matrix set scheduled to the user-side device comprises:

in a case that the precoding matrix group indicated by the precoding matrix indication information is a non-specific precoding matrix group in a first precoding matrix set, the precoding matrix set scheduled to the user-side device being the first precoding matrix set, in a case that the precoding matrix group indicated by the precoding matrix indication information is a first specific precoding matrix group in a second precoding matrix set, the precoding matrix set scheduled to the user-side device being a precoding matrix set associated with the second precoding matrix set through the precoding matrix group indicated by the precoding matrix indication information.

7. The method according to claim 6, wherein the spatial characteristic parameter set comprises at least one set element, the set element is a spatial characteristic parameter group, and the spatial characteristic parameter group comprises at least one spatial characteristic parameter.

8. The method according to claim 6, wherein the first indication information is a rank indication (RI), the RI indirectly indicates, through mapping relationship between an RI and a spatial characteristic parameter set, the spatial characteristic parameter set scheduled to the user-side device; and/or, the first indication information is information of a resource of a physical downlink control channel (PDCCH); transmitting the first indication information comprises: transmitting the PDCCH, wherein mapping relationship between a resource of a PDCCH and a spatial characteristic parameter set indirectly indicates the spatial characteristic parameter set scheduled to the user-side device.

9. The method according to claim 8, wherein, in a case that the first indication information is the information of the resource of the PDCCH, the resource of the PDCCH is a control resource set (CORESET).

10. The method according to claim 8, wherein, after transmitting the first indication information, the method further comprises:

transmitting spatial characteristic parameter indication information, wherein the spatial characteristic parameter indication information is used to directly indicate a spatial characteristic parameter scheduled to the user-side device in the spatial characteristic parameter set.

11. A network-side device, comprising:

a storage, a processor, and a program of indicating a spatial characteristic parameter set, wherein the program of indicating a spatial characteristic parameter set is stored on the storage and executable by the processor; in a case that the program of indicating a spatial characteristic parameter set is executed by the processor, the processor implements steps of the method of indicating a spatial characteristic parameter set according to claim 6.

12. The network-side device according to claim 11, wherein, the spatial characteristic parameter set comprises at least one set element, the set element is a spatial characteristic parameter group, and the spatial characteristic parameter group comprises at least one spatial characteristic parameter.

13. The network-side device according to claim 11, wherein, the first indication information is a rank indication (RI), the RI indirectly indicates, through mapping relationship between an RI and a spatial characteristic parameter set, the spatial characteristic parameter set scheduled to the user-side device; and/or, the first indication information is information of a resource of a physical downlink control channel (PDCCH); transmitting the first indication information comprises: transmitting the PDCCH, wherein mapping relationship between a resource of a PDCCH and a spatial characteristic parameter set indirectly indicates the spatial characteristic parameter set scheduled to the user-side device.

14. The network-side device according to claim 13, wherein, in a case that the first indication information is the information of the resource of the PDCCH, the resource of the PDCCH is a control resource set (CORESET).

15. The network-side device according to claim 13, wherein, in a case that the program of indicating a spatial characteristic parameter set is executed by the processor, the processor further implements: after transmitting the first indication information, transmitting spatial characteristic parameter indication information, wherein the spatial characteristic parameter indication information is used to directly indicate a spatial characteristic parameter scheduled to the user-side device in the spatial characteristic parameter set.

16. A user-side device, comprising:
a storage, a processor, and a program of indicating a spatial characteristic parameter set, wherein the program of indicating a spatial characteristic parameter set is stored on the storage and executable by the processor; in a case that the program of indicating the spatial characteristic parameter set is executed by the processor, the processor implements a method of indicating a spatial characteristic parameter set, the method comprises:
acquiring first indication information, wherein the first indication information indirectly indicates a spatial characteristic parameter set scheduled to the user-side device, and the spatial characteristic parameter set is one of a plurality of spatial characteristic parameter sets configured for the user-side device;
determining, according to the first indication information, the spatial characteristic parameter set scheduled to the user-side device, wherein the spatial characteristic parameter set comprises a beam set and/or a precoding matrix set,
wherein,
the spatial characteristic parameter set comprises a beam set, the first indication information is beam indication information, the beam indication information is used to directly indicate a beam group scheduled to the user-side device in the beam set: determining, according to the first indication information, the spatial characteristic parameter set scheduled to the user-side device comprises: determining, according to mapping relationship between beam indication information and a beam set, a beam set scheduled to the user-side device; and/or,
the spatial characteristic parameter set comprises a precoding matrix set, the first indication information is precoding matrix indication information, the precoding matrix indication information is used to directly indicate a precoding matrix group scheduled to the user-side device in the precoding matrix set: determining, according to the first indication information, the spatial characteristic parameter set scheduled to the user-side device comprises: determining, according to mapping relationship between precoding matrix indication information and a precoding matrix set, the precoding matrix set scheduled to the user-side device,
wherein any set among a plurality of beam sets is associated with another beam set through a specific beam group in the beam set;
determining, according to the mapping relationship between the beam indication information and the beam set, the beam set scheduled to the user-side device comprises:
determining, in a case that the beam group indicated by the beam indication information is a non-specific beam group in a first beam set, that the beam set scheduled to the user-side device is the first beam set;
determining, in a case that the beam group indicated by the beam indication information is a specific beam group in a second beam set that the beam set scheduled to the user-side device is a beam set associated with the second beam set through the beam group indicated by the beam indication information,
any precoding matrix set among a plurality of precoding matrix sets is associated with another precoding matrix set through a specific precoding matrix group in the precoding matrix;
determining, according to the mapping relationship between the precoding matrix indication information and the precoding matrix set, the precoding matrix set scheduled to the user-side device comprises,
determining, in a case that the precoding matrix group indicated by the precoding matrix indication information is a non-specific precoding matrix group in a first precoding matrix set, that the precoding matrix set scheduled to the user-side device is the first precoding matrix set,
determining, in a case that the precoding matrix group indicated by the precoding matrix indication information is a specific precoding matrix group in a second precoding matrix set, that the precoding matrix set scheduled to the user-side device is a precoding matrix set associated with the second precoding matrix set through the precoding matrix group indicated by the precoding matrix indication information.

17. The user-side device according to claim 16, wherein, the spatial characteristic parameter set comprises at least one set element, the set element is a spatial characteristic parameter group, and the spatial characteristic parameter group comprises at least one spatial characteristic parameter.

18. The user-side device according to claim 16, wherein, the first indication information is a rank indication (RI); determining, according to the first indication information, the spatial characteristic parameter set scheduled to the user-side device comprises: determining, according to mapping relationship between an RI and a spatial characteristic parameter set, the spatial characteristic parameter set scheduled to the user-side device;
or,
the first indication information is information of a resource of a physical downlink control channel (PDCCH);
acquiring the first indication information comprises: acquiring the information of the resource of a received PDCCH;
determining, according to the first indication information, the spatial characteristic parameter set scheduled to the user-side device comprises: determining, according to mapping relationship between the resource of the PDCCH and the spatial characteristic parameter set, the spatial characteristic parameter set scheduled to the user-side device.

19. The user-side device according to claim 18, wherein, in a case that the first indication information is the information of the resource of the PDCCH, the resource of the PDCCH is a control resource set (CORESET).

20. The user-side device according to claim 18, wherein, in a case that the program of indicating the spatial characteristic parameter set is executed by the processor, the processor further implements: after determining, according to the first indication information, the spatial characteristic parameter set scheduled to the user-side device,
receiving spatial characteristic parameter indication information, wherein the spatial characteristic parameter indication information is used to directly indicate a spatial characteristic parameter scheduled to the user-side device in the spatial characteristic parameter set;
determining, according to the spatial characteristic parameter indication information, the spatial characteristic parameter scheduled to the user-side device in the spatial characteristic parameter set.

* * * * *